June 21, 1960   A. W. HODGSON   2,942,080
CONTACTOR

Filed Dec. 30, 1958   3 Sheets-Sheet 1

United States Patent Office 2,942,080
Patented June 21, 1960

2,942,080
CONTACTOR

Alfred W. Hodgson, Orchard Park, N.Y., assignor to Westinghouse Electric Corporation, East Pittsburgh, Pa., a corporation of Pennsylvania Filed Dec. 30, 1958, Ser. No. 789,222

10 Claims. (Cl. 200—106)

This invention relates to contactors and more particularly to battery heater contactors.

It is known that at very low temperatures storage batteries do not develop their rated capacity so that if used for engine starting purposes they are not capable of operating a starting motor. It is essential, therefore, to bring the temperature of the battery up to a predetermined operating temperature before it is used to energize a starting motor. The most efficient way of heating a storage battery is to cause current to flow therein which may be done simply by short circuiting the battery. As the battery heats up, the short circuit current increases until it reaches a value corresponding to the desired operating temperature of the battery at which point the short circuit is removed and the battery is then ready to supply its normal load.

An object of the invention is to provide a battery heater contactor which will function in response to the short circuit current of a battery to interrupt the short circuit.

Another object of the invention is to provide a contactor for controlling a battery heating circuit in response to current of predetermined value.

Another object of the invention is to provide a battery heater contactor in which the control voltage is not available to hold the main contacts closed after the main contacts of the contactor close but a series coil effects opening of the main contacts when energized by currents of predetermined value.

Another object of the invention is to provide a contactor according to the preceding paragraph wherein a series coil is provided for holding the main contacts closed on currents below the predetermined value.

Another object of the invention is to provide a contactor embodying a holding magnet including an armature for holding the contactor closed and a trip magnet for effecting opening movement of the holding magnet armature with stored energy means operable by the trip magnet to cause opening movement of the holding magnet armature.

The invention, both as to structure and operation, together with additional objects and advantages thereof, will be best understood from a study of the following detailed description thereof when made in conjunction with the accompanying drawings.

Figure 1:
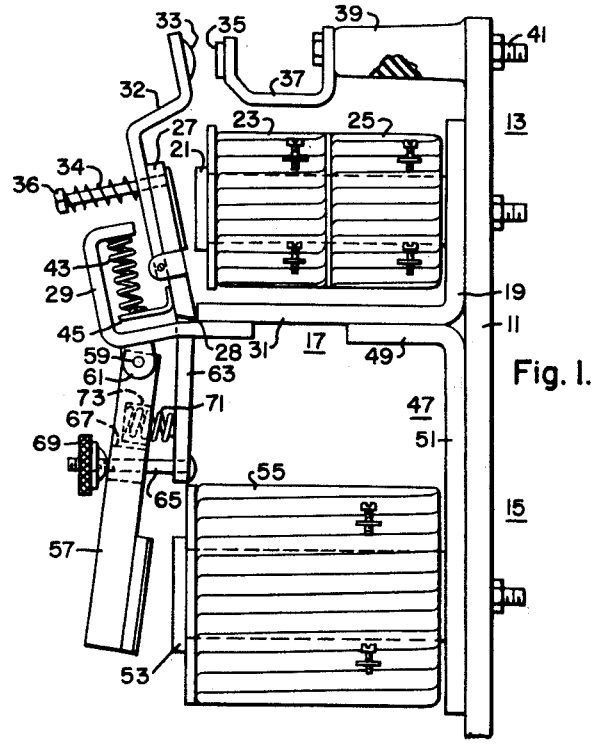
Figure 1 is a side elevational view of a contactor embodying the principles of the invention, the contactor being shown in the deenergized condition.

Referring to the drawings, the contactor is provided with a rigid base 11 of insulating material on which a holding magnet 13 and a trip magnet 15 are mounted. The holding magnet 13 comprises an L-shaped magnet yoke 17 having one leg 19 rigidly secured to the base 11. A core member 21 is rigidly secured to the leg 19 and has a voltage coil 23 and a series closing coil 25 mounted thereon.

A holding armature 27 is pivotally supported by a knife-edge bearing at 28 on a bracket 29 which is rigidly secured to the other leg 31 of the magnet yoke 17. A contact arm 32 pivotally mounted on the armature 27 and biased by a spring 34 carries a movable contact 33 which is adapted to cooperate with a stationary contact 35 mounted on the outer end of a U-shaped bracket 37. The spring 34 is compressed between the contact arm 32 and the head of a stud 36 mounted on armature 27. The bracket 37 is rigidly supported on an insulating support member 39 which, together with the bracket 37 is secured to the base 11 by a bolt 41. The bolt 41 may serve as a connector for connecting the contact 35 in the circuit to be controlled. A spring 43 compressed between a portion of the bracket 29 and a bracket 45 on the armature 27 biases the latter, as shown in Fig. 1, to its unattracted position.

Mounted on the base 11 below the holding magnet yoke 17 is a tripping magnet yoke 47 which has one leg 49 rigidly secured to the leg 31 of the magnet yoke 17. The other leg 51 of the magnet yoke 47 has mounted thereon the core member 53 of the tripping magnet 15 and a series tripping coil 55 is mounted on and surrounds the core member 53. A tripping armature 57 is pivotally mounted by means of a pivot pin 59 in spaced ears 61 supported on the under side of the bracket 29. A downwardly extending tail portion 63 of the holding armature 27 has rigidly mounted thereon a rod 65 which extends to the left to fit quite loosely through an opening 67 in the tripping armature 57. The rod has an adjusting nut 69 threaded onto its left end for engaging the left side of the armature 57. Stored energy means comprising a spring 71 is compressed between the tail portion 63 of the holding armature 27 and a spring seat 73 in the tripping armature 57 and thus biases the latter against the adjusting nut 69.

Figure 2:
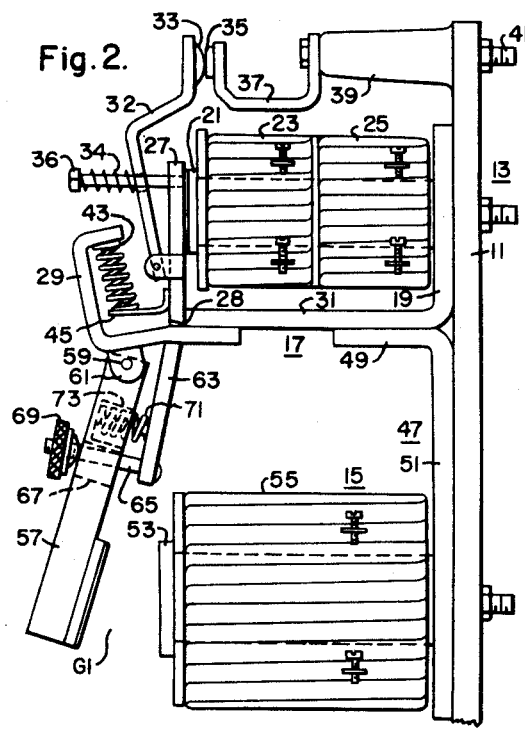
Fig. 2 is a view similar to Fig. 1 but showing the contactor voltage coil in energized condition and the main contacts closed, and the holding magnets and trip magnets energized at a relatively low current value.
Figure 6:
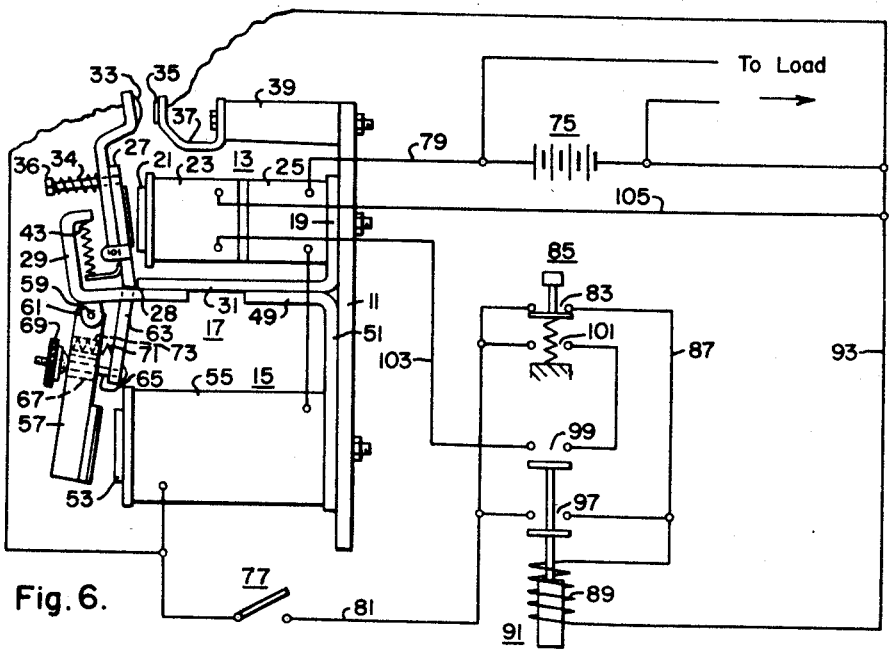
Fig. 6 is a circuit diagram of a battery heater control system embodying the principles of the invention.

Referring to Fig. 6, which shows a diagrammatic view of the contactor and control circuit therefor, the contactor is shown in the deenergized condition with the control circuit from a battery 75 open at a switch 77. Closure of the switch 77 establishes a circuit from the positive terminal of the battery 75 through conductor wire 79, holding coil 25, trip coil 55, switch 77, wire 81, contacts 83 of a start switch 85, wire 87, actuating coil 89 of an anticycle relay 91, and wire 93 to the negative terminal of the battery 75. Relay 91 thus picks up and closes its contacts 97 and 99. Closing of the contacts 97 seals in the relay 91 around the start switch contacts 83, and closure of the contacts 99 prepares a circuit for, as hereinbelow explained, energizing the voltage coil 23. In order to close the main contacts 33—35 of the contactor and start heating the battery, the start switch 85 is operated to open the contacts 83 and close the contacts 101. This operation establishes a circuit from positive conductor 81, through contacts 101 of the start switch 85, contacts 99 of relay 91, the voltage coil 23 of the contactor, and wire 105 to the negative wire 93. This closes the circuit through the voltage coil 23 and energizes the holding magnet 13 which attracts the armature 27 and closes the main contacts 33—35 as shown in Fig. 2. The start switch 85 is then released and returns to its normal position opening contacts 101 and closing contacts 83. This opens the circuit through the voltage coil 23 which deenergizes this coil. The current flowing through the series holding coil 25 is, however, sufficient to hold the main contacts 33—35 closed.

When the main contacts 33—35 close they connect the coils 25 and 55 directly across the battery 75 thus shunting the coil 89 of the anti-cycle relay 91. This deenergizes the coil 89 of the anti-cycle relay 91 and the relay drops out opening its contacts 97 and 99.

Figure 4:
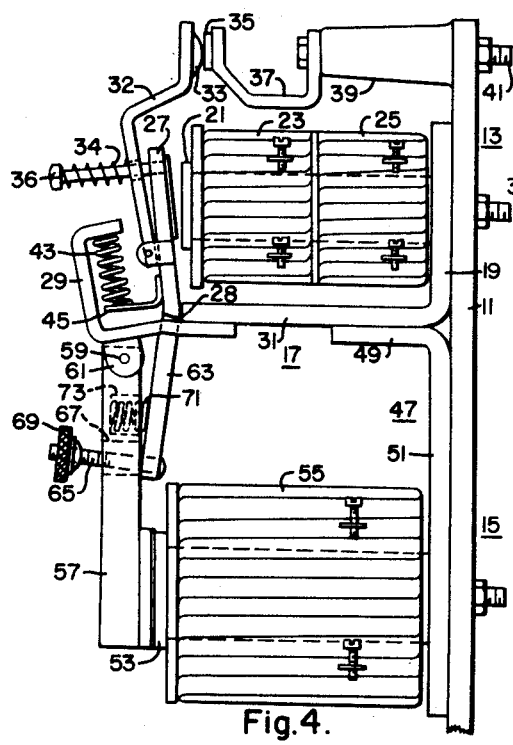
Fig. 4 is a view similar to the preceding views wherein the trip magnet has been energized sufficiently to start the main movable contact in opening direction.
Figure 5:
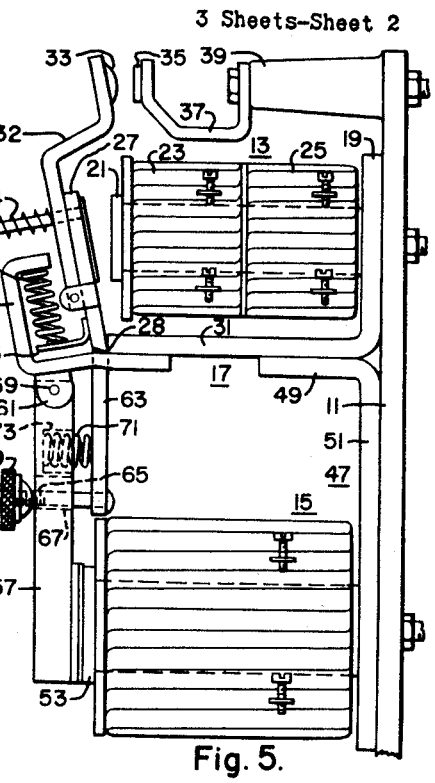
Fig. 5 shows the contactor in the tripped, or open, position.

The main contacts 33—35 will remain closed as long as the current through the coils 25 and 55 remains below a predetermined value which is determined by the air gap indicated at G1 (Fig. 2) and the characteristics of the kickout spring 71. When the current in the trip coil 55 reaches a predetermined value, the armature 57 will be attracted toward the core member 53 decreasing the air gap from G1 (Fig. 2) to G2 (Fig. 3) and, at the same time, compress the kickout spring 71. At this point (Fig. 3), the armature 57 is in engagement with the tail 63 of the main armature 27. The ampere turns of the trip coil 55 required to pull the armature 57 in at the air gap G1 (Fig. 2) are sufficient, when acting at air gap G2 (Fig. 3) to unseal the armature 27 of the holding magnet 13 since, at this point, the armature 57 is acting directly against the tail 63 of the main armature to unseal armature 27, and the main contacts will begin to open, as shown in Fig. 4. At this time, stated in more detail, the kickout spring 71 aided by the spring 43 acts to snap the main armature 27 at high speed to the full open position shown in Fig. 5. Upon opening of the main contacts, the coils become deenergized permitting the armatures 27 and 57 to return to the positions in which they are shown in Fig. 1.

When the main contacts 33—35 open voltage is restored to the anti-cycle relay coil 89 which picks up and prepares a circuit over its contacts 99 for energizing the voltage coil 23 of the holding magnet 13. A new cycle may then be initiated by manually operating the switch 85 to close its contacts 101 and open contacts 83. This causes the contactor to close its main contact 33—35 in the previously described manner. This causes loss of voltage in the coil 89 of relay 91 which drops out opening its contacts. If the current in the trip coil 55 should rise to tripping magnitude while the switch 85 is held depressed, the contactor will trip open but the relay 91 will not pickup at this time since the circuit through the coil 89 is open at the contacts 83 of the start switch. Before a cycle can be initiated in this situation, it is necessary to release the switch 85 which thus closes its contacts 83 energizing coil 89. This picks up the relay 91 which closes its seal-in contacts 97. The new cycle may then be started by again depressing the switch 85.

The kickout spring 71 provides kickout force only when the tripping armature 57 is picked up and hence, does not affect the minimum pickup of the contactor. The force applied by the kickout spring 71 may be varied by turning the adjusting nut 69 which, at the same time, varies the position of the armature 57 relative to the tail 63 of the armature 27 and relative to the core member 53 thus varying the current required to trip the contactor.

It is to be noted that the magnetic circuit of the holding magnet 13 is such that the core of the holding magnet will saturate at a lower current value than the trip magnet 15 so that at the higher current values the trip magnet field strength will increase at a greater rate than the holding magnet field strength to effect tripping the contactor open on currents above a predetermined value. Also, the polarity of the holding and trip magnets are arranged to buck each other. At the same time, the trip magnet coil may be energized by currents below the predetermined value without opening the main contacts or reducing the contact pressure on the main contacts.

Figure 3:
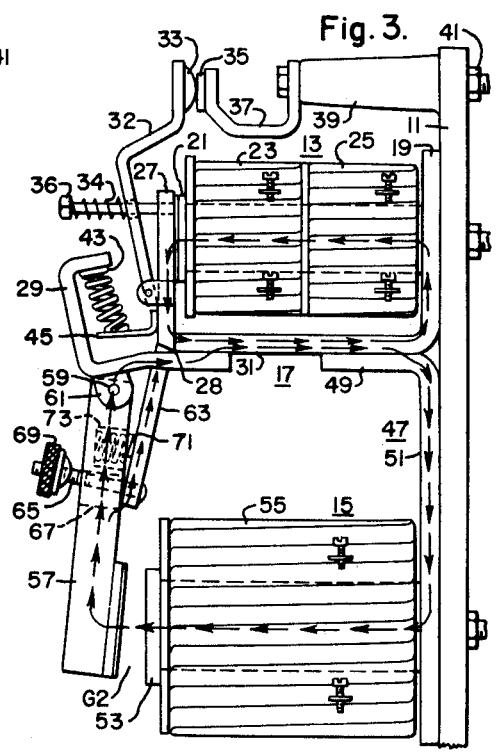
Fig. 3 shows the contactor with the holding magnet and the trip magnet energized by a considerably higher current value and showing the flux paths of the magnets.

In other words, and stated in somewhat more detailed language, the magnetic polarity of the holding coil 25 and the trip coil 55 are arranged to buck each other at the same time employ a common leg in their magnetic circuits, as shown in Fig. 3, so that as the field strength of the trip magnet increases it acts to saturate the common leg 31 which increases the reluctance of the magnetic circuit for the holding coil. The field in the magnetic circuit for the holding coil is thus weakened. Further, as the flux from the trip coil increases, its leakage flux through core 21 is in direct opposition to the flux produced by the holding coil to thus further weaken the holding effect of the holding coil.

Since magnetic field strength of trip magnet is in inverse proportion to air gaps G1 and G2 of Figures 2 and 3 an abrupt increase in trip magnet field strength will take place when current reaches a magnitude corresponding to trip current as gap of trip armature 57 changes from G1 of Figure 2 to G2 of Figure 3.

By designing contactor to take advantage of these features, trip magnet coil may be energized by currents up to the predetermined trip value without opening the main contacts or reducing the contact pressure on the main contacts, but when predetermined trip current is reached contacts will snap to the full open position to provide good arc interrupting characteristics.

Figure 7:
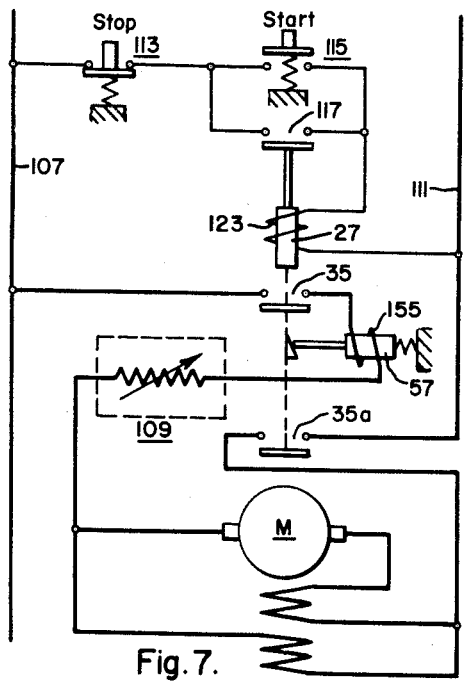
Fig. 7 is a circuit diagram embodying the contactor modified for use as a motor starter having instantaneous over current trip means.
Figure 8:
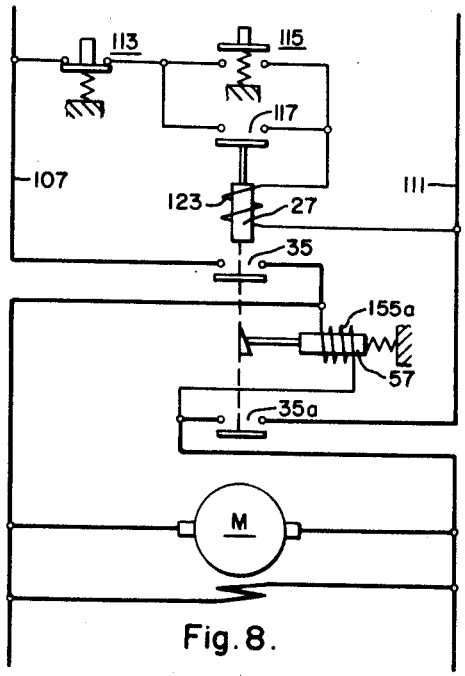
Fig. 8 is a circuit diagram embodying the contactor for use as a line contactor including overvoltage trip means.
Figure 9:
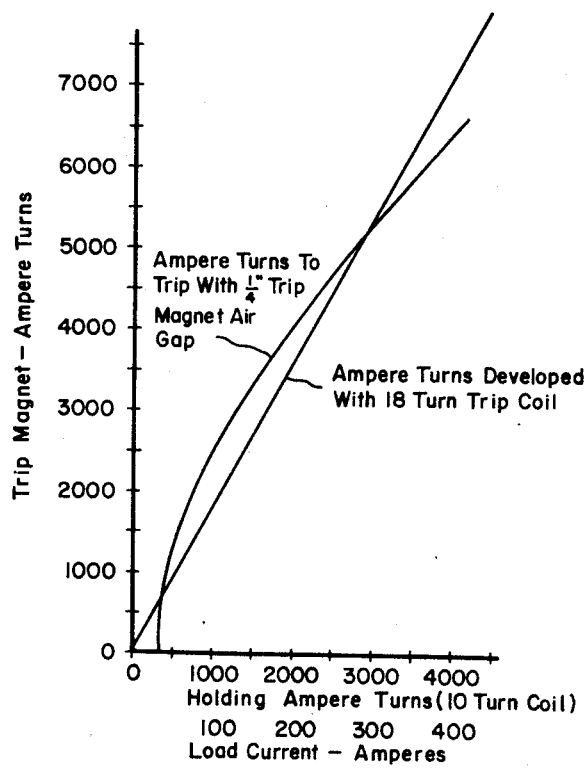
Fig. 9 is a set of curves showing the ampere turns on the trip coil required to unseal the holding magnet armature.

While the contactor has been illustrated as applied to battery heating, it will be obvious that it has other applications, for instance, where instantaneous over-current or overvoltage tripping is required as shown in Figs. 7 and 8.

Fig. 7 illustrates the contactor shown in Figs. 1–5 adapted for use as a motor starter including instantaneous over-current trip means. The structure of the contactor is the same as that shown in Fig. 1 with the exception that the holding coil 25 is omitted and two sets of contacts are provided. A voltage coil 123 serves as a closing and holding coil.

The motor M is connected in a circuit extending from a line 107 through the contacts 35 of the contactor, a resistance 109, the motor M, contacts 35a of the contactors to a line 111. The coil 123 of the closing and holding magnet is connected in a circuit which extends from the line 107 through the contacts of a stop switch 113, the contacts of a start switch 115 and the coil 123 to the line 111.

When the start switch 115 is closed the closing coil 123 is energized and closes the contacts 35 and 35a to energize the motor M. At the same time the contacts 117 of a holding interlock are closed by the armature 27 to seal in the coil 123 around the start switch 115 and maintain the motor M energized and running.

When an overload current of predetermined value occurs in the motor circuit the series trip coil 155 functions in the previously described manner to attract the armature 57 and effect opening of the contacts 35—35a. The motor M is thus deenergized as well as the closing and holding coil 123. The start switch 115 must then be closed in order to start the motor.

Fig. 8 illustrates the contactor of Fig. 1 adapted for use as a line contactor control with overvoltage trip. In this modification the control circuit is the same as that of Fig. 7. The series overload trip coil 155 of Fig. 7 is replaced by an overvoltage trip coil 155a which is connected across the lines 107—111 in parallel relation with the motor M.

The motor is started by closing the start switch 115 which energizes the closing and holding coil 123. Energization of the coil 123 actuates the armature 27 closing the contacts 35 and 35a to energize the motor and at the same time seals itself in over the contacts 117 of the interlock.

The occurrence of an overvoltage at or above a predetermined value across the voltage coil 155a energizes the overvoltage trip sufficiently to cause it to attract the armature 57 and cause opening of the contacts 35—35a of the contactor and open the circuit through the motor.

Having described the invention in accordance with the provision of the patent statutes, it is to be understood that various changes and modifications may be made in the structural details thereof without departing from the spirit of the invention.

I claim as my invention:

1. A contactor having stationary and movable contact means, a holding electromagnet including an operating armature movable to close and open said contact means, energizing means for said operating armature comprising both a voltage coil and a series current coil operable when energized to move said armature to close said contact means and electromagnetically hold said contact means closed, a tripping electromagnet including a tripping armature movable to mechanically act on said operating armature to effect opening of said contact means, a series current coil operable when energized by currents of predetermined value to move said tripping armature and initiate contact opening movement of said operating armature, and stored energy means operable by said tripping armature to effect high-speed opening of said contact means.

2. A contactor having stationary and movable contact means, a holding electromagnet including an operating armature movable to close and open said contact means, energizing means for said operating armature comprising both a voltage coil and a series current coil operable when energized to move said armature to close said contact means and electromagnetically hold said contact means closed, a tripping electromagnet including a tripping armature movable to mechanically act on said operating armature to effect opening of said contact means, a series current coil operable when energized by currents of predetermined value to move said tripping armature and initiate contact opening movement of said operating armature, stored energy means operable by said tripping armature to effect high-speed opening of said contact means, and means for adjusting said stored enregy means to vary the tripping point of said contactor.

3. A contactor having stationary and movable contact means, a holding electromagnet comprising a closing voltage coil, a holding series current coil and an operating armature operable upon energization of said voltage coil to close said contact means and operable to hold said contact means closed upon energization of said series current coil, a tripping electromagnet comprising a current coil connected in series relation with said holding current coil, a tripping armature operable upon energization of said tripping electromagnet by currents above a predetermined value to mechanically act on said operating armature to initiate opening movement of said operating armature, and spring means operable by said tripping armature to effect high-speed opening movement of said operating armature.

4. A contactor having stationary and movable contact means, a holding electromagnet comprising a closing voltage coil, a holding series current coil and an operating armature operable upon energization of said voltage coil to close said contact means and operable to hold said contact means closed upon energization of said series current coil, a tripping electromagnet comprising a current coil connected in series relation with said holding series current coil, a tripping armature operable upon energization of said tripping electromagnet by currents above a predetermined value to mechanically act on said operating armature to initiate opening movement of said operating armature, spring means operable by said tripping armature to effect high-speed opening movement of said operating armature, and adjusting means for adjusting the relative positions of said armatures.

5. A contactor comprising stationary and movable contact means, an electromagnet comprising an operating armature movable to close and open said contact means, a fixed core member, a voltage coil mounted on said fixed core members and operable when energized to close said contact means, a series current coil on said fixed core member operable when energized to hold said contact means closed, a tripping electromagnet comprising an energizing winding and a tripping armature operable upon energization of said winding in reponse to currents above a predetermined value to mechanically engage and to thus initiate opening movement of said operating armature, and spring means disposed between said armatures and operable to effect high-speed movement of said operating armature to the open contact position.

6. A contactor comprising stationary and movable contact means, an electromagnet comprising an operating armature movable to close and open said contact means, a fixed core member, a voltage coil mounted on said fixed core members and operable when energized to close said contact means, a series current coil on said fixed core member operable when energized to hold said contact means closed, a tripping electromagnet comprising an energizing winding and an armature operable upon energization of said winding in response to currents above a predetermined value to engage and initiate opening movement of said operating armature, spring means disposed between said armatures and operable to effect high-speed movement of said operating armature to the open contact position, and adjusting means for adjusting said spring means to thereby vary the current required to trip said contactor.

7. A contactor comprising stationary and movable contact means, an electromagnet comprising an operating armature movable to close and open said contact means, a fixed core member, a voltage coil mounted on said fixed core members and operable when energized to close said contact means, a series current coil on said fixed core member operable when energized to hold said contact means closed, a tripping electromagnet comprising an energizing winding and an armature operable upon energization of said winding in response to currents above a predetermined value to engage and initiate opening movement of said operating armature, spring means disposed between said armatures and operable to effect high-speed movement of said operating armature to the open contact position, and adjusting means for simultaneously adjusting said spring means and the relative positions of said armatures to thereby vary the current required to trip said contactor.

8. A contactor having relatively movable stationary and movable contact means, closing and holding electromagnetic means comprising an operating armature operable to close and open said contact means, a fixed core structure and energizing winding on said fixed core structure, tripping electromagnetic means comprising a tripping armature operable upon energization of said tripping electromagnet to engage and initiate opening movement of said operating armature, said tripping electromagnet having a fixed core structure a portion of which is common with the fixed core structure of said holding electromagnet, an energizing coil for said tripping electromagnet, energization of said tripping electromagnet by currents excess of a predetermined magnitude causing saturation of the common portion of said fixed core structures and causing said tripping armature to engage and effect opening movement of said operating armature.

9. A contactor having relatively movable stationary and movable contact means, closing and holding electromagnetic means comprising an operating armature operable to close and open said contact means, a fixed core structure and energizing winding on said fixed core structure, tripping electromagnetic means comprising a tripping armature operable upon energization of said tripping electromagnet to engage and initiate opening movement of said operating armature, said tripping electromagnet having a fixed core structure a portion of which is common with the fixed core structure of said holding electromagnet, an energizing coil for said tripping electromagnet, energization of said tripping electromagnet by currents in excess of a predetermined magnitude causing saturation of the common portion of said fixed core structures and causing said tripping armature to engage and effect opening movement of said operating armature, and spring means operable to effect high-speed opening movement of said operating armature.

10. A contactor having relatively movable stationary and movable contact means, closing and holding electromagnetic means comprising an operating armature operable to close and open said contact means, a fixed core structure and energizing winding on said fixed core structure, tripping electromagnetic means comprising a tripping armature operable upon energization of said tripping electromagnet to engage and initiate opening movement of said operating armature, said tripping electromagnet having a fixed core structure a portion of which is common with the fixed core structure of said holding electromagnet, an energizing coil for said tripping electromagnet, energization of said tripping electromagnet by currents in excess of a predetermined magnitude causing saturation of the common portion of said fixed core structures and causing said tripping armature to engage and effect opening movement of said operating armature, and means for adjusting the relative positions of said armatures to vary the current required to trip said contactor.

References Cited in the file of this patent

UNITED STATES PATENTS

| | | |
|---|---|---|
| 677,360 | Keeney | July 2, 1901 |
| 1,179,957 | Palmer | Apr. 18, 1916 |